3,142,705
METHOD FOR THE MANUFACTURE OF N-PHEN-YL-N-(4-NITROSOPHENYL)-HYDROXYLAMINE
Helmut Freytag, Cologne-Stammheim, Erich Klauke, Cologne-Flittard, Hugo Wilms, Leverkusen, Ernst Roos, Cologne-Flittard, and Joachim George, Leverkusen, Germany, assignors to Farbenfabriken Bayer Aktiengesellschaft, Leverkusen, Germany, a corporation of Germany
No Drawing. Filed Mar. 27, 1962, Ser. No. 182,935
Claims priority, application Germany Apr. 6, 1961
5 Claims. (Cl. 260—576)

The present invention relates to a method for the manufacture of N-phenyl-N-(4-nitrosophenyl)-hydroxylamine, and more particularly to a special reagent which is used for the dimerising rearrangement.

The dimerising rearrangement of nitrosobenzene with concentrated sulphuric acid to N-phenyl-N-(4-nitrosophenyl)-hydroxylamine is already known (E. Bamberger et al, Berichte der Deutschen Chemischen Gesellschaft, 31, page 1513 (1898)). The reaction may be represented by the following reaction scheme

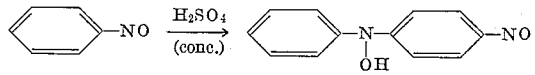

Although the rearrangement with concentrated sulphuric acid is effected quickly, there are also formed in addition to the desired hydroxylamine undefined, high-melting-point by-products. Furthermore, this method is unsuitable for the dimerising rearrangement of nitrosobenzene on a technical scale, since, in order to produce the thorough mixing and removal of heat, comparatively large quantities of concentrated sulphuric acid are necessary which must be mixed with ice or water, in order to isolate the reaction product. The further use of the resulting diluted sulphuric acid necessitates an expensive concentration, whilst, if the recovery of the sulphuric acid is not carried out, an expensive neutralisation step must be provided, in order to avoid contamination of waste water.

It is an object of the present invention to avoid the aforementioned disadvantages. A further object is to provide a new dimerisation agent. Other objects will appear hereinafter.

It has now been found that it is possible to produce, in a simple manner and avoiding the formation of by-products, high yields of N-phenyl-N-(4-nitrosophenyl)-hydroxylamine by the dimerising rearrangement of nitrosobenzene, if desired in the presence of an inert, organic solvent, with anhydrous hydrofluoric acid, at temperatures between −20 and +50° C.

The dimerising rearrangement of nitrosobenzene by means of anhydrous hydrofluoric acid into N-phenyl-N-(4-nitrosophenyl)-hydroxylamine is unexpected because hydrofluoric acid is a volatile acid, and other volatile acids are either completely ineffective with this method, or result in the resinification of the nitrosobenzene. If, for example, nitrosobenzene is rearranged in liquid sulphur dioxide, no reaction occurs and the nitrosobenzene may be recovered without change. If hydrochloric acid is used as dimerising rearranging agent, the nitrosobenzene is completely resinated. In neither case N-phenyl-N-(4-nitrosophenyl)-hydroxylamine is obtained.

Nitrosobenzene of commercial purity may be used as starting material and hydrofluoric acid of commercial purity may be used for carrying out the dimerising rearrangement.

Suitable inert organic solvents are, for example, aliphatic and aromatic hydrocarbons, halogenated hydrocarbons, such as chloroform and carbon tetrachloride, as well as ether, dioxane and particularly nitrobenzene. It is unnecessary for the solvents to dissolve the nitrosobenzene completely, it being sufficient if the solvents at least partly dissolve the nitrosobenzene. The reaction mixture may therefore have one or two phases.

The reaction is effected at temperatures between about −20 and +50° C., and preferably between 0° C. and +20° C. Preferably no additional pressure is applied.

If the temperature is within the upper part of the temperature range, a closed system must be used, because hydrofluoric acid evaporates at this temperature. Pressure will then result automatically as a function of the temperature.

The reaction according to the invention is conveniently carried out by providing hydrofluoric acid of suitable temperature and adding the nitrosobenzene to it. The reaction is complete after a few minutes and the hydrofluoric acid may be distilled off for further use. The hydrofluoric acid acts not only as rearranging agent, but simultaneously also as solvent. Generally 1–20 parts by weight hydrofluoric acid per part by weight nitrosobenzene are used. The reaction mixture is processed by means of methods known to the art, conveniently by distillation of the hydrofluoric acid, washing out of any hydrofluoric acid present in the residue with methanol, water or aqueous caustic potash solution, and isolation of the remaining N-phenyl-N-(4-nitrosophenyl)-hydroxylamine. The reaction product may also be separated from the reaction mixture by pouring into water, cooled with ice. However, in this case, the hydrofluoric acid is diluted, and this is disadvantageous.

It is, furthermore, possible to use instead of nitrosobenzene such compounds which yield under the reaction conditions nitrosobenzene. Thus, in a special embodiment of the method according to the invention, the nitrosobenzene is replaced by phenyl-hydroxylamine and an oxidising agent, such as sodium bichromate. In this case, the nitrosobenzene in the reaction solution according to the invention is formed directly from the phenylhydroxylamine.

The method of the invention has a number of advantages: Thus, the rearranging agent may be recovered and re-used in a simple manner. It is not necessary to destroy the rearranging agent, which may be diluted with water, by a complicated process. Furthermore, the reaction may be carried out at low temperatures, so that the formation of by-products is inhibited.

*Example 1*

100 cc. anhydrous hydrofluoric acid were placed in a stirring apparatus of copper and cooled to 0° C. 50 g. nitrosobenzene were added during a period of about 10 minutes. The internal temperature is allowed to rise to +10° C. and stirring is continued at this temperature for 5 minutes after the addition has been terminated. The hydrofluoric acid is then separated by vacuum distillation and the residue containing reaction product diluted with 100 cc. water. After filtration by suction, the slightly yellowish green substance is again eluted with water and a slightly alkaline pH value (pH: approx. 8) is produced by adding dilute aqueous potassium hydroxide solution. After further filtration with suction, filter residue is washed with dilute acetic acid and water and the still moist product is redissolved from methanol. There result 43 g. (86% of the theoretical) pure N-phenyl-N-(4-nitrosophenyl)-hydroxylamine of slightly olive green colour. The melting point is 142° C. with decomposition.

In order to determine its constitution the product is catalytically reduced, yielding 93% 4-amino-diphenylamine. The melting point of the crude material is 70–72° C.

*Example 2*

25 g. nitrosobenzene is added during a period of 5 minutes to 100 cc. anhydrous hydrofluoric acid, cooled to 0° C. A reddish-brown solution is formed during the exothermic reaction. After the addition has been completed, the temperature of the solution is allowed to rise during a period of about 30 minutes to +18° C., and the product is poured on about 500 g. ice. The resulting precipitate of yellowish-green crystals is filtered with suction, washed with water and dried. The yield is practically quantitative. A sample recrystallised from water melts at 142° C.

*Example 3*

30 g. of nitrosobenzene dissolved in 100 cc. dioxane are added dropwise within 15 minutes into 150 cc. of anhydrous hydrofluoric acid cooled to −10° C. The reaction mixture is thereafter stirred for 10 minutes and the tempertaure is then slowly raised up to +18° C. The red reaction mixture is poured onto ice and diluted with water. The precipitated N-phenyl-N-(4-nitrosophenyl)-hydroxylamine is filtered off. The melting point of the raw material is 133° C. with decomposition.

The working up can be carried out obviously as well as described in Example 1.

*Example 4*

30 g. of pulverised sodium bichromate are dissolved in 150 cc. anhydrous hydrofluoric acid while cooling. Into this solution there is added slowly within 15 minutes at a temperature of between 0–10° C. the suspension of 22 g. phenylhydrozylamine in 150 cc. nitrobenzene. The reaction which is at first strong exothermic becomes less exothermic after addition of ⅔ of the phenylhydroxylamine. Thereafter the mixture is stirred ta 10° C. for 5 minutes and then poured onto 1 kg. of ice and thereafter dissolved with 1 litre of water. The mixture is filtered off with suction, the filtrate made neutral by addition of potassium hydroxide. Then the organic phase of the filtrate is separated and the nitrobenzene contained therein distilled off with steam. The residue is taken up in chloroform. The chloroform solution is filtered, dried with sodium sulphate and concentrated. Thereby 4 g. of a crystal mass is obtained which is treated with methanol. Thus, N-phenyl-N-(4-nitrosophenyl)-hydroxylamine is obtained as slightly brownish crystalline powder. The melting point of the crude material is 127–131° C.

We claim:

1. A process for the production of N-phenyl-N-(4-nitrosophenyl)hydroxylamine which comprises contacting nitrosobenzene with anhydrous hydrofluoric acid at a temperature between −20 and +50° C. and subsequently recovering the resulting N-phenyl-N-(4-nitrosophenyl)-hydroxylamine.

2. A process for the production of N-phenyl-N-(4-nitrosophenyl)hydroxylamine which comprises contacting a solution of nitrosobenzene in an inert organic solvent with anhydrous hydrofluoric acid at a temperature between −20 and +50° C. and subsequently recovering the resulting N-phenyl-N-(4-nitrosophenyl)hydroxylamine.

3. A process as defined in claim 2 in which the inert solvent is a member of the group consisting of aliphatic and aromatic hydrocarbons, chloroform, carbon tetrachloride, ether, dioxane, and nitrobenzene.

4. A process as defined in claim 2 in which the inert solvent is dioxane.

5. A process as defined in claim 2 in which the inert solvent is nitrobenzene.

References Cited in the file of this patent

Boyer et al.: Jour. Org. Chem., vol. 24, page 2038 (1959).